United States Patent [19]
Karube et al.

[11] Patent Number: 5,440,580
[45] Date of Patent: Aug. 8, 1995

[54] LASER DISCHARGE TUBE AND ELECTRODE MANUFACTURING METHOD

[75] Inventors: Norio Karube; Yoshiki Fujioka; Mitsuo Manabe, all of Tokyo, Japan

[73] Assignee: Fanuc Ltd., Minamitsuru, Japan

[21] Appl. No.: 332,403

[22] Filed: Oct. 31, 1994

[30] Foreign Application Priority Data

Nov. 17, 1993 [JP] Japan ................. 5-287849

[51] Int. Cl.$^6$ ............................................. H01S 3/097
[52] U.S. Cl. ...................................... 372/87; 372/61; 372/82
[58] Field of Search ................... 372/57, 61, 82

[56] References Cited

U.S. PATENT DOCUMENTS

| | | | |
|---|---|---|---|
| 4,689,798 | 8/1987 | Fox et al. | 372/87 |
| 4,759,028 | 7/1988 | Nettleton et al. | 372/87 |
| 4,802,184 | 1/1989 | Karube | 372/82 |
| 4,910,749 | 3/1990 | Karube | 372/87 |

*Primary Examiner*—Léon Scott, Jr.
*Attorney, Agent, or Firm*—Staas & Halsey

[57] ABSTRACT

A laser discharge tube having electrodes the peeling of which is reduced and a method of manufacturing electrodes of a laser discharge tube by which the peeling of the electrodes is reduced. The electrodes are adhered to the outside periphery of the tube wall of the laser discharge tube. The electrodes contain as components an electric conductive substance, an inorganic binder and boron nitride as a thermal expansion preventing substance for suppressing a coefficient of thermal expansion. When a silica glass tube is used as the laser discharge tube, the laser discharge tube has a coefficient of thermal expansion of $+0.5 \times 10^{-6}$. When the electrodes are mixed with boron nitride, the electrodes have a coefficient of thermal expansion of $+2$ to $+7 \times 10^{-6}$ and the coefficient of thermal expansion of the electrodes can be brought close to the that of the laser discharge tube by mixing boron nitride with the electrodes. Thus, the peeling of the electrodes caused by a difference of the coefficients of thermal expansion can be reduced.

16 Claims, 4 Drawing Sheets

LASER DISCHARGE TUBE AND ELECTRODE MANUFACTURING METHOD

BACKGROUND OF THE INVENTION (1) Field of the Invention

The present invention relates to a laser discharge tube used in a laser oscillator and a method of manufacturing electrodes of a laser discharge tube, and more specifically, to a laser discharge tube by which the damage of electrodes disposed on the outside periphery of the tube wall of the discharge tube is reduced and a method of manufacturing electrodes of a laser discharge tube.

(2) Description of the Related Art

A discharge tube used in a laser oscillator induces discharge in response to a high voltage applied thereto and outputs a laser beam produced by a laser gas excited by the discharge to the outside. Incidentally, the high voltage is applied to electrodes adhered to the outside periphery of the tube wall of the discharge tube and the discharge takes place between the electrodes confronting each other across the discharge tube. Therefore, discharge normally takes place within a region determined by the width of the electrodes. The discharge tube is composed of silica glass and the electrodes are composed of silver or the like which has good conductivity. The electrodes are formed by adhering silver to the outside wall of the discharge tube by metalizing or the like.

Nevertheless, since a very high high-frequency voltage (e.g., 4000 V) is applied to the electrodes, the electrodes generates a considerable amount of power consumption. That is, since laser output from a laser oscillator is repeatedly turned on and off, the electrodes are repeatedly heated and cooled, by which strain stress is produced between the silica glass constituting the discharge tube and the metalized silver constituting the electrodes. Thus, the electrodes are deteriorated and peeled in a certain life time. A main factor for producing such strain stress is a difference between a coefficient of the silica glass tube and that of the metalized silver. More specifically, since the coefficients of thermal expansion are greatly different, the electrodes are lifted up by a heat cycle resulting from the turning on and off of a laser output so that the electrodes are deteriorated and peeled.

Further, when a very high high-frequency voltage is applied to the electrodes, there is a possibility that dielectric breakdown is caused in regions other than the region between the electrodes and Corona discharge takes place. The Corona discharge is liable to take place at the portion of the discharge tube having a high temperature such as, for example, at the downstream of a laser gas flowing in the discharge tube.

When a high voltage is applied to the electrodes, since the high voltage flows between the electrodes and the outside wall of the discharge tube, breakdown is caused at the edge portion of the electrodes and Corona discharge takes place. The Corona discharge travels once along the surface of the outside wall of the discharge tube and then gets into the discharge tube at a position apart from the electrodes by several millimeters. At the time, the silver is also melted and flown out and the flown-out silver grows to a tree-branch-shape along the outside wall of the discharge tube from the electrodes and covers the outside wall of the discharge tube in the vicinity of the electrodes with a width of several centimeters. When such a phenomenon occurs in which the silver serving as the electrode material migrates (so called an electro-migration), a dielectric strength is further lowered and Corona discharge is more liable to take place, and as a result, the flow-out of the electrode material and deterioration of the electrodes, and the like become more significant.

That is, when the coefficients of thermal expansion has different values, the electrodes are lifted up by the heat cycle and deteriorated and peeled. Corona discharge is more liable to take place in the deteriorated portions and the peeled portions of the electrodes. Therefore, the deterioration of electrodes which start once is accelerated by Corona discharge.

As described above, thermal expansion and Corona discharge caused by power consumption is made more significant when a temperature increases, by which the deterioration and peeling of electrodes are accelerated. Although the deterioration and the like of the electrodes can be prevented by lowering a voltage applied thereto, power to be supplied is lowered accordingly. Thus, a laser beam machining requiring a large amount of power cannot be executed. Further, although there is a method of lowering the temperature of the electrodes by mounting heat radiation plates on the electrodes, thermal expansion arising on the surface where the electrodes are adhered to the discharge tube cannot be avoided by this method. Thus, Corona discharge caused at the downstream of a laser gas where the temperature of the discharge tube is raised to high cannot be also prevented.

SUMMARY OF THE INVENTION

Taking the above into consideration, an object of the present invention is to provide a laser discharge tube by which the peeling of electrodes is reduced.

Further, another object of the present invention is to provide a method of manufacturing a laser discharge tube by which the peeling of electrodes can be reduced.

To solve the above object, according to the present invention, there is provided a laser discharge tube for inducing a discharge in response to an applied high-frequency voltage and exciting a laser gas, which comprises electrodes adhered to the outside periphery of the tube wall of the laser discharge tube, and further contain an electric conductive substance having a positive coefficient of thermal expansion, a thermal expansion preventing substance having a negative coefficient of thermal expansion and an inorganic binder for adhering the electric conductive substance and the thermal expansion preventing substance to the outside periphery of the tube wall.

Further, there is provided a method of manufacturing electrodes of a laser discharge tube, which comprises the steps of making paste by mixing in a solvent an electric conductive substance having a positive coefficient of thermal expansion, a thermal expansion preventing substance having a negative coefficient of thermal expansion, an inorganic binder for adhering the electric conductive substance and the thermal expansion preventing substance to the outside periphery of the tube wall of the laser discharge tube and an organic binder for making the electric conductive substance, the thermal expansion preventing substance and the inorganic binder to a paste state, coating the paste to the laser discharge tube according to the configuration of the electrodes, heating and drying the paste to volatilize the solvent and, thermally decomposing the organic binder as well as dissolving the inorganic binder by baking the paste and adhering the electric conductive substance and the thermal expansion preventing substance to the outside periphery of the tube wall.

Since the electrodes adhered to the outside periphery of the tube wall contain as constituting substances the electric conductive substance having a positive coefficient of thermal expansion, the thermal expansion preventing substance having a negative coefficient of thermal expansion and the inorganic binder for adhering the electric conductive substance and the thermal expansion preventing substance to the outside periphery of the tube wall, a difference between the coefficient of thermal expansion of the electrodes and that of the laser discharge tube can be reduced.

Further, according to the method of manufacturing the electrodes, first, the electric conductive substance, the thermal expansion restricting substance, the inorganic binder and the organic binder for making the electric conductive substance, the thermal expansion restricting substance and the inorganic binder to a paste state are mixed in the solvent to make paste. The paste is coated to the laser discharge tube according to the configuration of the electrodes. Next, the paste is heated and dried to volatilize the solvent. Further, the paste is baked to thermally decompose the organic binder as well as dissolve the inorganic binder so that the electric conductive substance and the thermal expansion restricting substance are adhered to the outside periphery of the tube wall to thereby make the electrodes. In such a manner, the laser discharge tube having the electrodes whose coefficient of thermal expansion is close to that of the discharge tube can be made.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be described below with reference to the drawings.

Figure 2:
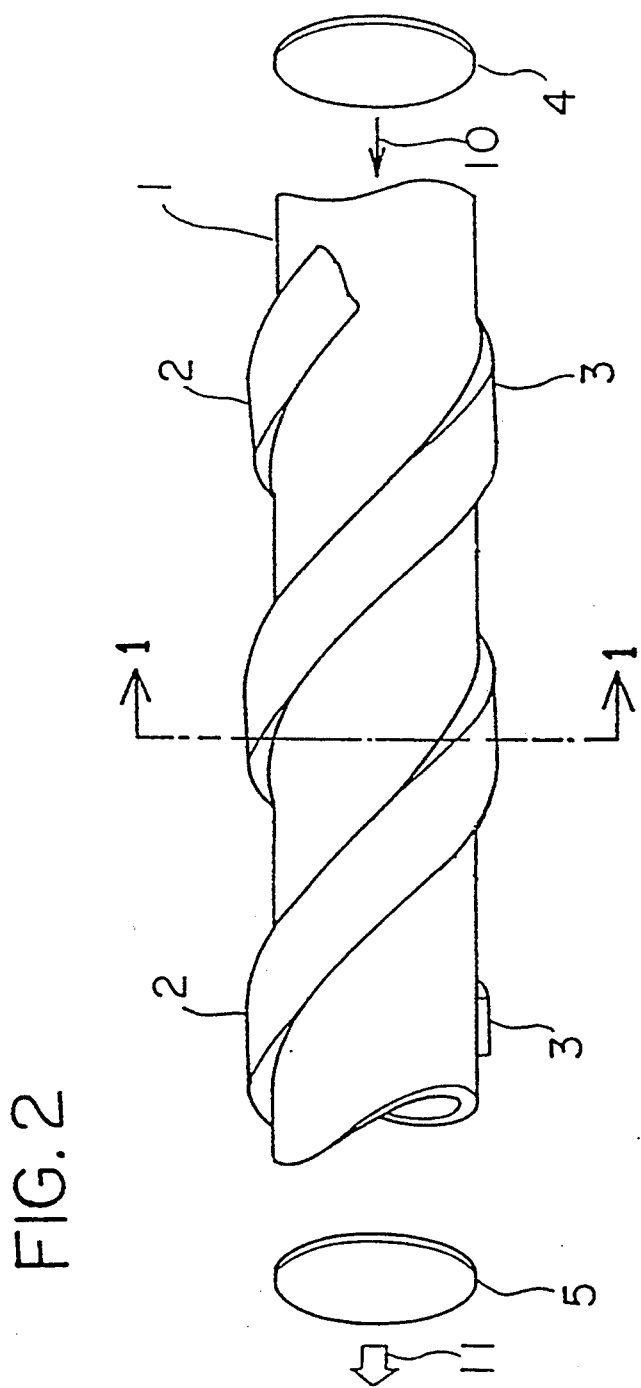
FIG. 2 is a view schematically showing the arrangement of a laser oscillator using the laser discharge tube according to the present invention.

FIG. 2 is a view schematically showing the arrangement of a laser oscillator using a laser discharge tube according to the present invention. The laser discharge tube 1 is a pipe with a circular cross section comprising a dielectric material (e.g., silica glass). Two electrode portions 2, 3 are helically disposed on the outside periphery of the laser discharge tube 1 at the same pitch. A laser gas 10 flows in the laser discharge tube 1 in the direction of a tube axis indicated by an arrow, and when a high-frequency voltage is applied between the electrodes 2 and 3 from a high-frequency power supply (not shown), a discharge takes place in the laser discharge tube 1 between the electrodes confronting each other across the discharge tube 1 and the laser gas 10 is excited. A totally reflecting mirror 4 and an output coupling mirror 5 are disposed at the opposite ends of the laser discharge tube 1 to constitute a Fabry-Perot reflector and a beam discharged from the molecules of the excited laser gas is amplified and a part thereof is output from the output coupling mirror 5 as a laser beam 11. The laser beam 11 is irradiated to a workpiece for the laser machining thereof.

Figure 1:
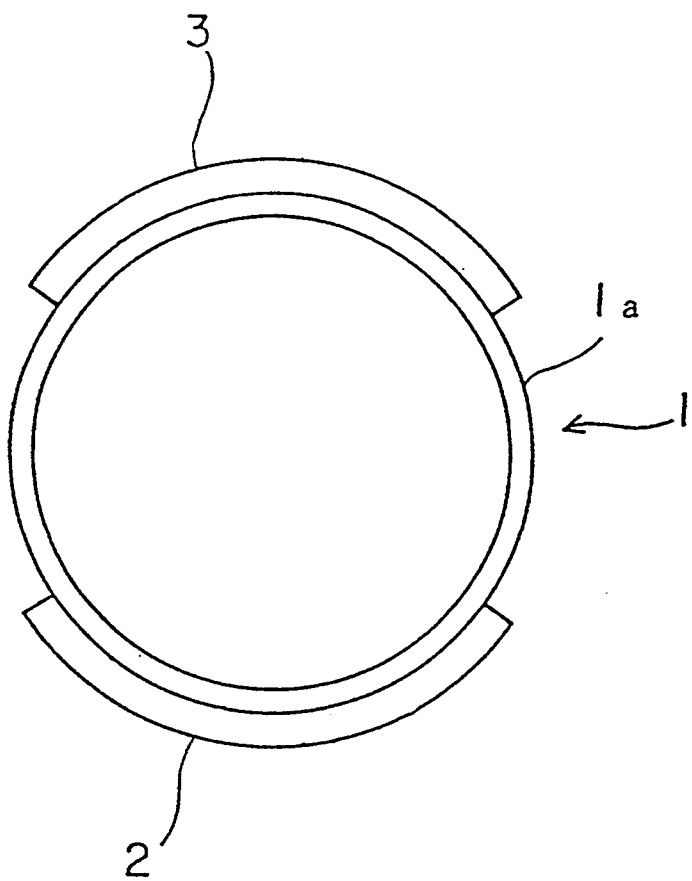
FIG. 1 is a view showing the arrangement of a laser discharge tube according to the present invention.

FIG. 1 shows the arrangement of the laser discharge tube according to the present invention, which is a cross sectional view taken along the line 1—1 of FIG. 2. The cross section of the laser discharge tube 1 comprises the laser discharge tube 1 and the electrodes 2 and 3 adhered to the outside periphery 1a of the tube wall of the laser discharge tube 1. A silica glass tube is used as the laser discharge tube 1. The electrodes 2 and 3 contain as components an electric conductive substance, a thermal expansion restricting substance, and an inorganic binder for adhering the electric conductive substance and the thermal expansion restricting substance to the outside periphery of the wall tube and are formed by being vapor deposited on the outside periphery 1a of the tube wall by metalization. Silver is used as the electric conductive substance, boron nitride (BN) is used as the thermal expansion restricting substance, and a lead type substance ($PbO.B_2O_3$) is used as the inorganic binder. The silica glass tube has a coefficient of thermal expansion of $+0.5 \times 10^{-6}$ or higher. Silver has a positive coefficient of thermal expansion of $+10 \times 10^{-6}$ or higher. Boron nitride has a negative coefficient of $-0.48 \times 10^{-6}$. Consequently, electrodes containing boron nitride in a weight ratio of 1–10% have a coefficient of thermal expansion of $+2$ to $+7 \times 10^{-6}$. That is, the coefficient of thermal expansion of the electrodes can be brought considerably close to that of the silica glass tube.

Next, a method of manufacturing the laser discharge tube described above will be described. In this example, a silica glass tube is used as the laser discharge tube, powdered silver is used as the electric conductive material of the electrodes, boron nitride is used as the thermal expansion restricting substance, and a lead type substance ($PbO.B_2O_3$) is used as the inorganic binder. An organic binder for making the silver, boron nitride and the lead type substance ($PbO.B_2O_3$) to a paste state and a solvent for dissolving them are used as other necessary substances. An acrylic resin is used as the organic binder and terpineol is used as the solvent.

First, the silver, boron nitride, inorganic binder ($PbO.B_2O_3$) and acrylic resin are mixed in the terpineol and made to a paste state. At this time, the boron nitride is contained in a weight ratio of 1 to 10% to the total weight of the silver, boron nitride and inorganic binder ($PbO.B_2O_3$). The thus prepared paste is referred to as electric conductive paste. The electric conductive paste has a good dispersing property into mesh as well as suitable viscosity and fluidity. Further, since the electric conductive paste has a good transferring property when it is coated onto the surface of the discharge tube by screen printing or offset printing, a smooth configurational accuracy and uniform electric characteristics of an electrode pattern can be obtained.

The electric conductive paste is spirally coated onto the surface of the silica glass tube according to the electrode configuration of the silica glass tube by screen printing. Next, the discharge tube is heated and dried. At this time, the terpineol as the solvent in the paste is volatilized. Further, the discharge tube is baked. At the time, the acrylic resin as the organic binder is thermally decomposed and the inorganic binder ($PbO.B_2O_3$) is dissolved. The dissolved inorganic binder ($PbO.B_2O_3$) causes the powdered silver to adhere each other as well as acts to adhere the silver and boron nitride to the surface of the silica glass tube. As a result, the silver and boron nitride are vapor deposited on the laser discharge tube as the electrodes. Then, the silver, inorganic binder ($PbO.B_2O_3$) and boron nitride finally remain as the components of the electrodes. The laser discharge tube provided with the electrodes containing boron nitride is made as described above.

Physical properties of the electrodes made as described above will be described with reference to the graphs.

Figure 3:
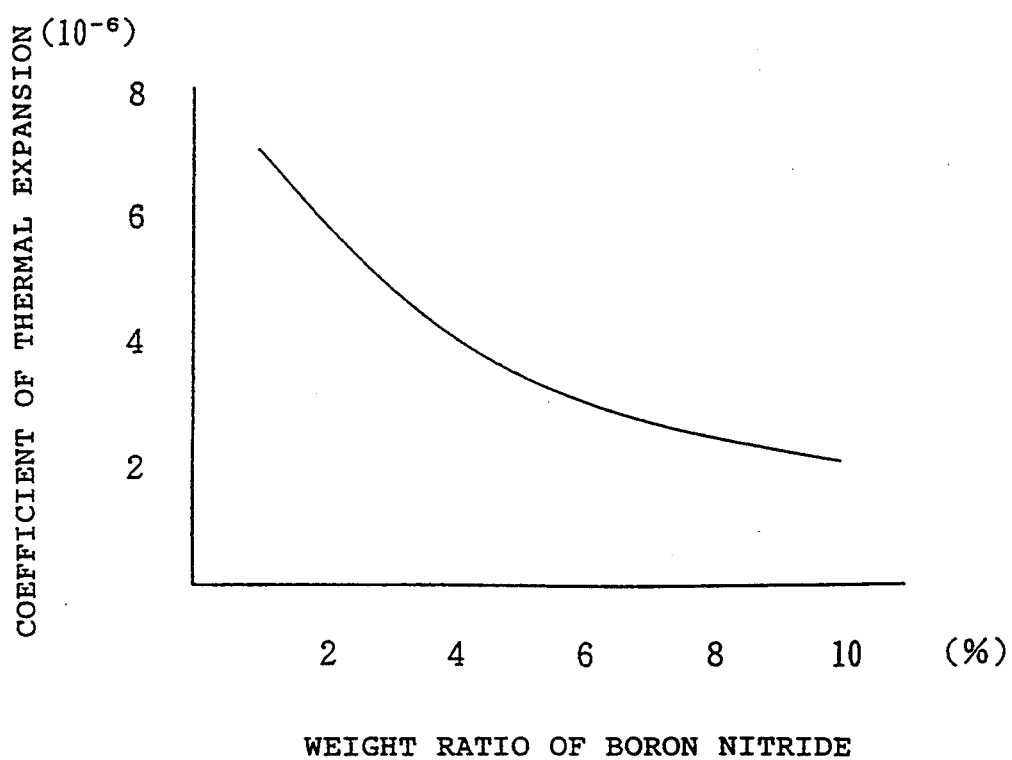
FIG. 3 is a graph showing the relationship between a weight ratio of boron nitride to electrodes and a coefficient of thermal expansion.

FIG. 3 is a graph showing the relationship between a weight ratio of boron nitride to electrodes and a coefficient of thermal expansion. Electrodes which do not contain boron nitride has a coefficient of thermal expansion of about $+10 \times 10^{-6}$. When boron nitride having a coefficient of thermal expansion of $-0.48 \times 10^{-6}$ is contained in the electrodes and an amount of the boron nitride is increased, the coefficient of thermal expansion of the electrodes is lowered. Then, when the amount of boron nitride is increased to 10%, the coefficient of thermal expansion of the electrodes becomes $+2 \times 10^{-6}$.

Figure 4:
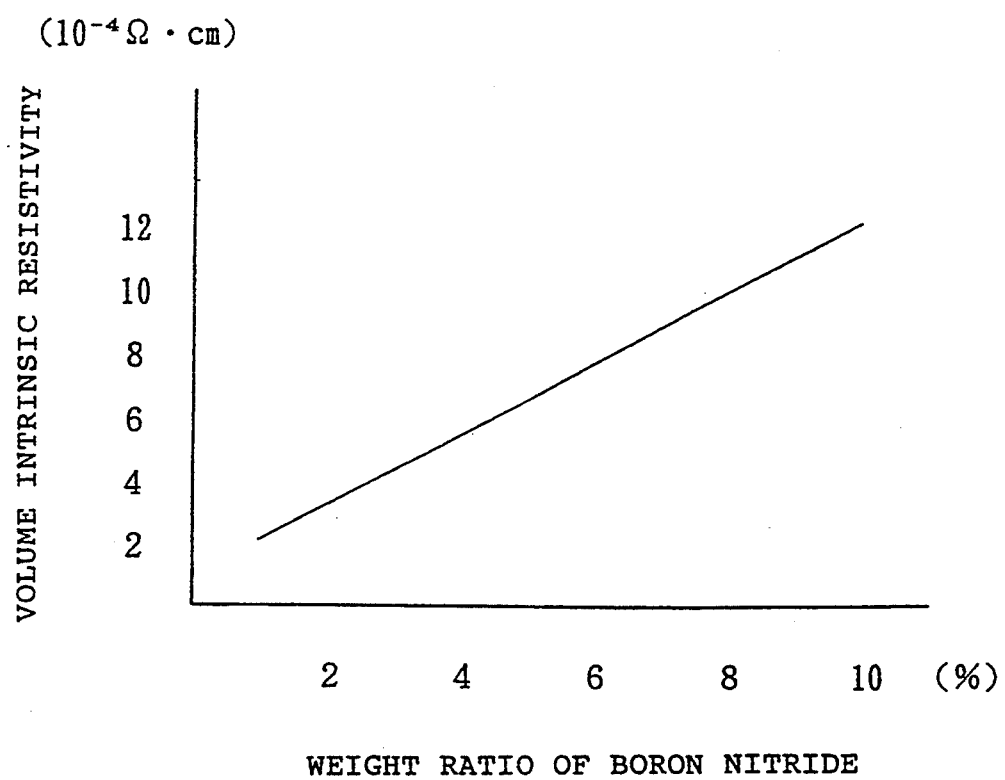
FIG. 4 is a graph showing the relationship between a weight ratio of boron nitride to electrodes and a volume intrinsic resistivity.

FIG. 4 is a graph showing the relationship between a weight ratio of boron nitride to electrodes and a volume intrinsic resistivity. In the graph, a value of the volume intrinsic resistivity of the electrodes is increased by increasing an amount of boron nitride to be contained in the electrodes. Then, when the amount of boron nitride is increased to 10%, the volume intrinsic resistivity of the electrodes becomes $12 \times 10^{-4}$ $\Omega$.cm.

The followings can be considered from FIGS. 3 and 4. When an amount of boron nitride is too little, although a resistance value is suppressed to a low level, a coefficient of thermal expansion is almost unchanged. If the coefficient of thermal expansion is almost unchanged, an effect for suppressing strain stress caused by the repetition of heating and cooling is lost. If so, a meaning for containing boron nitride is lost. Consequently, boron nitride is preferably contained in a weight ratio of 1% or more.

On the other hand, when an amount of the boron nitride is too much, although a coefficient of thermal expansion is suppressed to a low level, a resistance value is increased. When the volume intrinsic resistivity becomes $12 \times 10^{-4}$ $\Omega$.cm or higher, the capability of the electrodes is lowered and an amount of power consumption is also increased. When the amount of power consumption is increased, an amount of thermal expansion is increased accordingly. Thus, the electrodes are liable to be deteriorated and peeled by the heat cycle caused by the turning on and off of a laser output, which results in an adverse effect to an output of a strong laser beam. Thus, a suitable weight ratio of boron nitride is 10% or less. Because of the reasons as mentioned above, an excellent effect can be obtained when boron nitride is contained in a weight ratio of 1 to 10%.

When the amount of boron nitride is continuously increased, the coefficient of thermal expansion is rapidly reduced up to the weight ratio of the boron nitride of 5%. When the amount of the boron nitride is further increased and the weight ratio thereof exceeds 7%, the amount of reduction of the coefficient of thermal expansion becomes considerably small, from which it can be found that the optimum weight ratio of the boron nitride is 5-7% at which the coefficient of thermal expansion is balanced best with the volume intrinsic resistivity.

Further, the deterioration and peeling of the electrodes can be more prevented by the provision of a ceramic coating layer on the outside periphery of the electrodes of the laser discharge tube. The ceramic coating layer is made as described below.

A case will be described here in which a ceramic type paint mainly composed of titanium composite oxide ($TiO$, $Al_2TiO_5$, $MgTiO_3$, etc.) is used as the ceramic material of a dielectric layer. When the ceramic type paint is used, the paint mixed with a binder is coated onto the electrodes 2 and 3 and baked in a thermostat at several hundred degrees of temperature to make the electrodes 2, 3. Silicon or Tyranno-polymer (Si—Ti—C—O) is used as the binder. The electrodes 2, 3 are completely covered with the thus made ceramic coating layer (dielectric layer). Incidentally, when the ceramic type paint is used, the electrodes can be adjusted to exhibit a low coefficient of thermal expansion and a high coefficient of heat transfer by the mixture of titanium composite oxide.

As described above, a coefficient of thermal expansion can be reduced to a value of about one fifth by the mixture of boron nitride with the electrodes. Then, a difference between the coefficient of thermal expansion of the electrodes and that of the silica glass tube is considerably reduced, by which strain stress caused when the laser discharge tube is repeatedly heated and cooled can be suppressed. As a result, the deterioration and peeling of the electrodes caused by a change of temperature can be suppressed. Then, the occurrence of Corona discharge can be also prevented by the suppression of the deterioration and peeling of the electrodes.

Further, since the deterioration and peeling of the electrodes are difficult to be caused, the life of the laser discharge tube is greatly prolonged. Further, a power to be supplied which has been suppressed to a low level to prevent the harmful influence of Corona discharge and the like can be sufficiently increased. The power to be supplied can be increased to about two times a conventional level, which leads to the reduction of size and the increase of output of a laser apparatus.

Although silver is used as the electric conductive substance in the above description, an electric conductive material such as silver palladium and the like may be used.

Although terpineol is used as the solvent, butylcarbitol acetate may be used as the solvent.

Although the lead type substance ($PbO.B_2O_3$) is used as the inorganic binder, a zinc type substance ($PbO.B_2O_3.ZnO$) may be used.

Although silica glass is used as the laser discharge tube, other dielectric material which is highly resistant to breakdown (e.g., alumina, aluminum titanate) may be used.

Although the electric conductive paste is coated by screen printing, it may be coated by offset printing.

Although spiral electrodes are metalized to the discharge tube, plate-shaped electrodes may be metalized.

As described above, according to the present invention, since the electrodes of the laser discharge tube are mixed with the thermal expansion restricting substance, the coefficient of thermal expansion of the electrodes can be brought close to that of the silica glass tube and the like constituting the discharge tube, so that the peeling of the electrodes caused by a difference of the coefficients of thermal expansion can be prevented.

Further, since the electrodes are made in such a manner that the thermal expansion preventing substance is mixed with the electrodes of the laser discharge tube and the paste is made by the mixture of the organic binder and the inorganic binder, the electrodes of the laser discharge tube can be made in which the peeling of the electrodes caused by a difference of the coefficients of thermal expansion can be prevented.

Thus, the life of the laser discharge tube can be greatly prolonged by the electrodes whose peeling can be prevented.

Further, the power to be supplied of the discharge tube can be increased by the electrodes whose peeling can be prevented, whereby an output from a laser oscillator can be increased.

The forgoing is considered as illustrative only of the principles of the present invention. Further, since numerous modifications and changes will readily occur to those skilled in the art, it is not desired to limit the invention to the exact construction and applications shown and desired, and accordingly, all suitable modifications and equivalents may be regarded as falling within the scope of the invention in the appended claims and their equivalents.

What is claimed is:

1. A laser discharge tube for inducing a discharge in response to an applied high-frequency voltage and exciting a laser gas, comprising:
    electrodes which are adhered to the outside periphery of the tube wall of said laser discharge tube, and further contain an electric conductive substance having a positive coefficient of thermal expansion, a thermal expansion preventing substance having a negative coefficient of thermal expansion and an inorganic binder for adhering said electric conductive substance and said thermal expansion preventing substance to the outside periphery of said tube wall.

2. A laser discharge tube according to claim 1, wherein said electric conductive substance is silver or silver palladium.

3. A laser discharge tube according to claim 1, wherein said thermal expansion preventing substance is boron nitride (BN).

4. A laser discharge tube according to claim 3, wherein said boron nitride is mixed with the substances constituting said electrodes in a weight ratio of 1–10%.

5. A laser discharge tube according to claim 4, wherein said boron nitride is mixed with the substances constituting said electrodes in a weight ratio of 5–7%.

6. A laser discharge tube according to claim 1, having a ceramic coating layer on the outside periphery of said electrodes.

7. A method of manufacturing electrodes of a laser discharge tube, comprising the steps of:
    making paste by mixing in a solvent an electric conductive substance having a positive coefficient of thermal expansion, a thermal expansion preventing substance having a negative coefficient of thermal expansion, an inorganic binder for adhering said electric conductive substance and said thermal expansion preventing substance to the outside periphery of the tube wall of said laser discharge tube and an organic binder for making said electric conductive substance, said thermal expansion preventing substance and said inorganic binder to a paste state;
    coating said paste to said laser discharge tube according to the configuration of said electrodes;
    heating and drying said paste to volatilize said solvent;
    thermally decomposing said organic binder as well as dissolving said inorganic binder by baking said paste and adhering said electric conductive substance and said thermal expansion preventing substance to the outside periphery of said tube wall.

8. A method of manufacturing electrodes of a laser discharge tube according to claim 7, wherein said electric conductive substance is silver or silver palladium.

9. A method of manufacturing electrodes of a laser discharge tube according to claim 7, wherein said thermal expansion preventing substance is boron nitride (BN).

10. A method of manufacturing electrodes of a laser discharge tube according to claim 9, wherein said boron nitride is mixed with the substances constituting said electrodes in a weight ratio of 1–10%.

11. A method of manufacturing electrodes of a laser discharge tube according to claim 10, wherein said boron nitride is mixed with the substances constituting said electrodes in a weight ratio of 5–7%.

12. A method of manufacturing electrodes of a laser discharge tube according to claim 7, wherein said organic binder comprises terpineol or butylcarbitor acetate.

13. A method of manufacturing electrodes of a laser discharge tube according to claim 7, wherein said inorganic binder comprises a lead type substance ($PbO \cdot B_2O_3$) or a zinc type substance ($PbO \cdot B_2O_3 \cdot ZnO$).

14. A method of manufacturing electrodes of a laser discharge tube according to claim 7, wherein said paste is coated by screen printing.

15. A method of manufacturing electrodes of a laser discharge tube according to claim 7, wherein said paste is coated by offset printing.

16. A method of manufacturing electrodes of a laser discharge tube according to claim 7, wherein a ceramic coating layer is formed on the outside periphery of said electrodes after said paste is dried.

* * * * *